United States Patent
Xiao et al.

(10) Patent No.: US 12,525,686 B2
(45) Date of Patent: Jan. 13, 2026

(54) SOLID-STATE ELECTROLYTES INCLUDING LITHIATED ZEOLITE PARTICLES AND LITHIUM-CONTAINING MATERIALS AND METHODS OF FORMING THE SAME

(71) Applicant: GM GLOBAL TECHNOLOGY OPERATIONS LLC, Detroit, MI (US)

(72) Inventors: Xingcheng Xiao, Troy, MI (US); Robert D. Schmidt, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 652 days.

(21) Appl. No.: 17/939,460

(22) Filed: Sep. 7, 2022

(65) Prior Publication Data

US 2024/0079726 A1  Mar. 7, 2024

(51) Int. Cl.
*H01M 50/449* (2021.01)
*H01M 10/0525* (2010.01)
(Continued)

(52) U.S. Cl.
CPC ..... *H01M 50/449* (2021.01); *H01M 10/0525* (2013.01); *H01M 50/403* (2021.01); *H01M 50/437* (2021.01)

(58) Field of Classification Search
CPC ............. H01M 50/449; H01M 50/437; H01M 50/403; H01M 10/0525; H01M 10/0561; H01M 10/0562
(Continued)

(56) References Cited

U.S. PATENT DOCUMENTS 10,483,592 B2  11/2019 Xiao et al.
10,615,461 B2   4/2020 Xiao et al.
(Continued)

FOREIGN PATENT DOCUMENTS

CN  114665097 A  * 6/2022  ........ H01M 10/0525
CN  117673444 A    3/2024
(Continued)

OTHER PUBLICATIONS

ACS Material LLC, Y-type Zeolites, ACS Material LLC, Aug. 2019 (Year: 2019).*
(Continued)

*Primary Examiner* — Sean P Cullen
(74) *Attorney, Agent, or Firm* — Harness, Dickey & Pierce, P.L.C.

(57) ABSTRACT

A solid-state electrolyte for an electrochemical cell that cycles lithium ions is provided. The solid-state electrolyte includes a sintered layer that includes a plurality of lithiated zeolite particles having pores and a lithium-containing material disposed in at least a portion of the pores of the lithiated zeolite particles. For example, each lithiated zeolite particle has a porosity greater than or equal to about 20 vol. % to less than or equal to about 80 vol. %, and the lithium-containing material occupies greater than or equal to about 20% to less than or equal to about 80% of a total porosity of each lithiated zeolite particle. In certain instances, the sintered layer further includes a superionic additive that is also disposed in a portion of the pores of the lithiated zeolite particles, such that the sintered layer has an ionic conductivity between about $1\times10^{-5}$ S·cm$^{-1}$ and about $1\times10^{-1}$ S·cm$^{-1}$.

18 Claims, 3 Drawing Sheets

(51) Int. Cl.
*H01M 50/403* (2021.01)
*H01M 50/437* (2021.01)

(58) Field of Classification Search
USPC .................... 429/129, 304, 319, 322, 323
See application file for complete search history.

(56) References Cited

U.S. PATENT DOCUMENTS

| | | | |
|---|---|---|---|
| 10,950,836 B2 | 3/2021 | Xiao et al. | |
| 11,936,066 B2 | 3/2024 | Xiao et al. | |
| 12,214,331 B2 | 2/2025 | Xiao et al. | |
| 2018/0254449 A1* | 9/2018 | Xiao | H01M 50/449 |
| 2019/0097261 A1* | 3/2019 | Miller | H01M 10/052 |
| 2020/0403204 A1 | 12/2020 | Xiao et al. | |
| 2021/0083294 A1 | 3/2021 | Xiao et al. | |
| 2021/0159493 A1 | 5/2021 | Xiao et al. | |
| 2021/0344004 A1 | 11/2021 | Liu et al. | |
| 2022/0158221 A1* | 5/2022 | Chen | H01M 50/446 |
| 2022/0200039 A1* | 6/2022 | Xiao | H01M 50/491 |
| 2024/0021787 A1 | 1/2024 | Xiao et al. | |

FOREIGN PATENT DOCUMENTS

| | | |
|---|---|---|
| DE | 102023109948 A1 | 3/2024 |
| KR | 2016061498 A * 6/2016 | .......... H01M 10/052 |
| WO | WO-9919921 A1 * 4/1999 | ............... C08K 3/01 |

OTHER PUBLICATIONS

Xiao, Xingcheng et al., U.S. Appl. No. 17/375,414, filed Jul. 14, 2021 entitled "Lithium Ion-Exchanged Zeolite Particles for Electrochemical Cells and Methods of Making the Same," 58 pages.

Xiao, Xingcheng et al.; U.S. Appl. No. 17/390,757, filed Jul. 30, 2021 entitled "Processes for Preparing Functional Particles for Use in Electrochemical Cells and Electrochemical Cells Including Said Functional Particles;" 64 pages.

Xingcheng Xiao et al.; U.S. Appl. No. 17/864,279, filed Jul. 13, 2022, entitled "Functional Hybrid Powder as Additive for Electrochemical Cells"; 57 pages.

M. Smaihi et al.; "Sol-gel preparation and lithium dynamics in the Li4SiO4—Li3PO4 solid solution"; Solid State Ionics 48; Aug. 1, 1991; pp. 213-223.

KyuJung Jun et al.; "Lithium superionic conductors with corner-sharing frameworks"; Nature Materials, 21; Mar. 31, 2022; pp. 924-931.

A-M. Welsch et al.; "Ionic conductivity in single-crystal LiAlSi2O6: influence of structure on lithium mobility"; Phys Chem Minerals, 42; Jan. 20, 2015; pp. 413-420.

* cited by examiner

SOLID-STATE ELECTROLYTES INCLUDING LITHIATED ZEOLITE PARTICLES AND LITHIUM-CONTAINING MATERIALS AND METHODS OF FORMING THE SAME

INTRODUCTION

This section provides background information related to the present disclosure which is not necessarily prior art.

Electrochemical energy storage devices, such as lithium-ion batteries, can be used in a variety of products, including automotive products such as start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes and an electrolyte component and/or separator. One of the two electrodes can serve as a positive electrode or cathode, and the other electrode can serve as a negative electrode or anode. A separator filled with electrolyte may be disposed between the negative and positive electrodes. The electrolyte is suitable for conducting lithium ions between the electrodes and, like the two electrodes, may be in solid and/or liquid form and/or a hybrid thereof (e.g., semi-solid). In instances of solid-state batteries, a solid-state electrolyte (or solid-state separator) may physically separate the electrodes such that a distinct separator is not required.

SUMMARY

This section provides a general summary of the disclosure, and is not a comprehensive disclosure of its full scope or all of its features.

The present disclosure relates to solid-state or semi-solid batteries, and more specifically, to solid-state electrolytes for solid-state or semi-solid batteries, as well as to methods of making and using the same.

In various aspects, the present disclosure provides a solid-state electrolyte for an electrochemical cell that cycles lithium ions. The solid-state electrolyte may include a sintered layer that includes a plurality of lithiated zeolite particles having pores and a lithium-containing material disposed in at least a portion of the pores of the lithiated zeolite particles.

In one aspect, each lithiated zeolite particle may have a porosity greater than or equal to about 20 vol. % to less than or equal to about 80 vol. %, and the lithium-containing material may occupy greater than or equal to about 20% to less than or equal to about 80% of a total porosity of each lithiated zeolite particle.

In one aspect, the lithiated zeolite particles defining the plurality may have an average particle size greater than or equal to about 100 nanometers to less than or equal to about 5 micrometers, and an average pore diameter for each lithiated zeolite particle may be greater than or equal to about 0.1 nanometer to less than or equal to about 2 nanometers.

In one aspect, an average particle size of the lithium-containing material may be greater than or equal to about 0.1 nanometer to less than or equal to about 2 nanometers.

In one aspect, the lithium-containing material may be selected from the group consisting of: lithium phosphate ($Li_3PO_4$), lithium nitrate ($LiNO_3$), lithium fluoride (LiF), lithium oxide ($Li_2O$), lithium peroxide ($Li_2O_2$), lithium lanthanum titanate ($La_{0.5}Li_{0.5}TiO_3$), thio-LISICON ($Li_{3.25}Ge_{0.25}P_{0.75}S_4$), sulfide glass ceramics and combinations thereof.

In one aspect, the sintered layer may include greater than or equal to about 20 wt. % to less than or equal to about 80 wt. % of the lithiated zeolite particles, and greater than or equal to about 20 wt. % to less than or equal to about 80 wt. % of the lithium-containing material.

In one aspect, the lithiated zeolite particles may be defined by linked $AlO_2$ and $SiO_2$ tetrahedral units and extra-framework cations dispersed among the tetrahedral units. The extra-framework cations may include greater than or equal to about 10 wt. % of the lithium ions. The linked $AlO_2$ and $SiO_2$ tetrahedral units may have an aluminum to silicon ratio greater than or equal to about 0.2.

In one aspect, the sintered layer may further include a superionic additive that is also disposed in a portion of the pores of the lithiated zeolite particles.

In one aspect, the sintered layer may have an ionic conductivity greater than or equal to about $1 \times 10^{-5}$ S·cm$^{-1}$ to less than or equal to about $1 \times 10^{-1}$ S·cm$^{-1}$.

In one aspect, the sintered layer may include greater than or equal to about 20 wt. % to less than or equal to about 80 wt. % of the superionic additive.

In one aspect, the superionic additive may be selected from the group consisting of: $Li_{10}GeP_2S_{12}$, $Li_7La_3Zr_2O_{12}$, $Li_3N$, $LiB_{11}H_{14}$, $LiBH_4$, $Li_{2+x}Zr_{1-x}M_xCl_6$ (where M is In, Sc, or a combination thereof and 1 wt. % ≤ x ≤ 40 wt. %)), and combinations thereof.

In various aspects, the present disclosure provides an electrochemical cell that cycles lithium ions. The electrochemical cell may include a first electrode, a second electrode, and a solid-state electrolyte physically separating the first and second electrodes. The first electrode may include a positive electroactive material. The second electrode may include a negative electroactive material. The solid-state electrolyte may include a plurality of lithiated zeolite particles having pores and a lithium-containing material disposed in at least a portion of the pores defined in each lithiated zeolite particle.

In one aspect, each lithiated zeolite particle may have a porosity greater than or equal to about 20 vol. % to less than or equal to about 80 vol. %, and the lithium-containing material may occupy greater than or equal to about 20% to less than or equal to about 80% of a total porosity of each lithiated zeolite particle.

In one aspect, the lithiated zeolite particles may be defined by linked $AlO_2$ and $SiO_2$ tetrahedral units and extra-framework cations dispersed among the tetrahedral units. The extra-framework cations may include greater than or equal to about 10 wt. % of the lithium ions. The linked and $SiO_2$ tetrahedral units may have an aluminum to silicon ratio greater than or equal to about 0.2.

In one aspect, the lithium-containing material may be selected from the group consisting of: lithium phosphate ($Li_3PO_4$), lithium nitrate ($LiNO_3$), lithium fluoride (LiF), lithium oxide ($Li_2O$), lithium peroxide ($Li_2O_2$), lithium lanthanum titanate ($La_{0.5}Li_{0.5}TiO_3$), thio-LISICON ($Li_{3.25}Ge_{0.25}P_{0.75}S_4$), sulfide glass ceramics and combinations thereof.

In one aspect, the solid-state electrolyte may further include greater than or equal to about 20 wt. % to less than or equal to about 60 wt. % of a superionic additive also disposed in pores of the lithiated zeolite particles.

In one aspect, the superionic additive may be selected from the group consisting of: $Li_{10}GeP_2S_{12}$, $Li_7La_3Zr_2O_{12}$, $Li_3N$, $LiB_{11}H_{14}$, $LiBH_4$, $Li_{2+x}Zr_{1-x}M_xCl_6$ (where M is In, Sc, or a combination thereof and 1 wt. % ≤ x ≤ 40 wt. %)), and combinations thereof.

In various aspects, the present disclosure provides a method for forming a solid-state electrolyte layer for use in an electrochemical cell that cycles lithium ions. The method may include obtaining a plurality of lithiated zeolite particles having pores, the lithiated zeolite particles defining a zeolite powder; impregnating at least a portion of pores with a lithium-containing material to form impregnated lithium zeolite particles; heating the impregnated lithium zeolite particles to a first temperature greater than or equal to about 200° C. to less than or equal to about 600° C. to remove any gaseous byproducts and to form a pre-sintered zeolite powder; applying a first pressure to the pre-sintered zeolite powder to form a pellet; and heating the pellet to a second temperature greater than or equal to about 800° C. to less than or equal to about 1,200° C. while applying a second pressure greater than 0 MPa to less than or equal to about 50 MPa to form a sintered body that defines the solid-state electrolyte layer.

In one aspect, the lithium-containing material may include lithium phosphate ($Li_3PO_4$) and the impregnating may include contacting the lithiated zeolite particles with a $(NH_4)_3PO_4$ solution such that the $(NH_4)_3PO_4$ solution enters into a portion of the pores of the lithiated zeolite particles, and contacting LiOH to the lithiated zeolite particles including the $(NH_4)_3PO_4$ solution such that $Li_3PO_4$ forms within the portion of the pores thereby forming the impregnated lithium zeolite particles.

In one aspect, the lithium-containing material may include lithium nitrate ($LiNO_3$) and the impregnating may include contacting lithium nitrate ($LiNO_3$) to water to form an aqueous solution, contacting the aqueous solution to the lithiated zeolite particles to form an admixture, and heating the admixture to precipitate the lithium nitrate ($LiNO_3$) within a portion of the pores of the lithiated zeolite forming the impregnated lithium zeolite particles.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
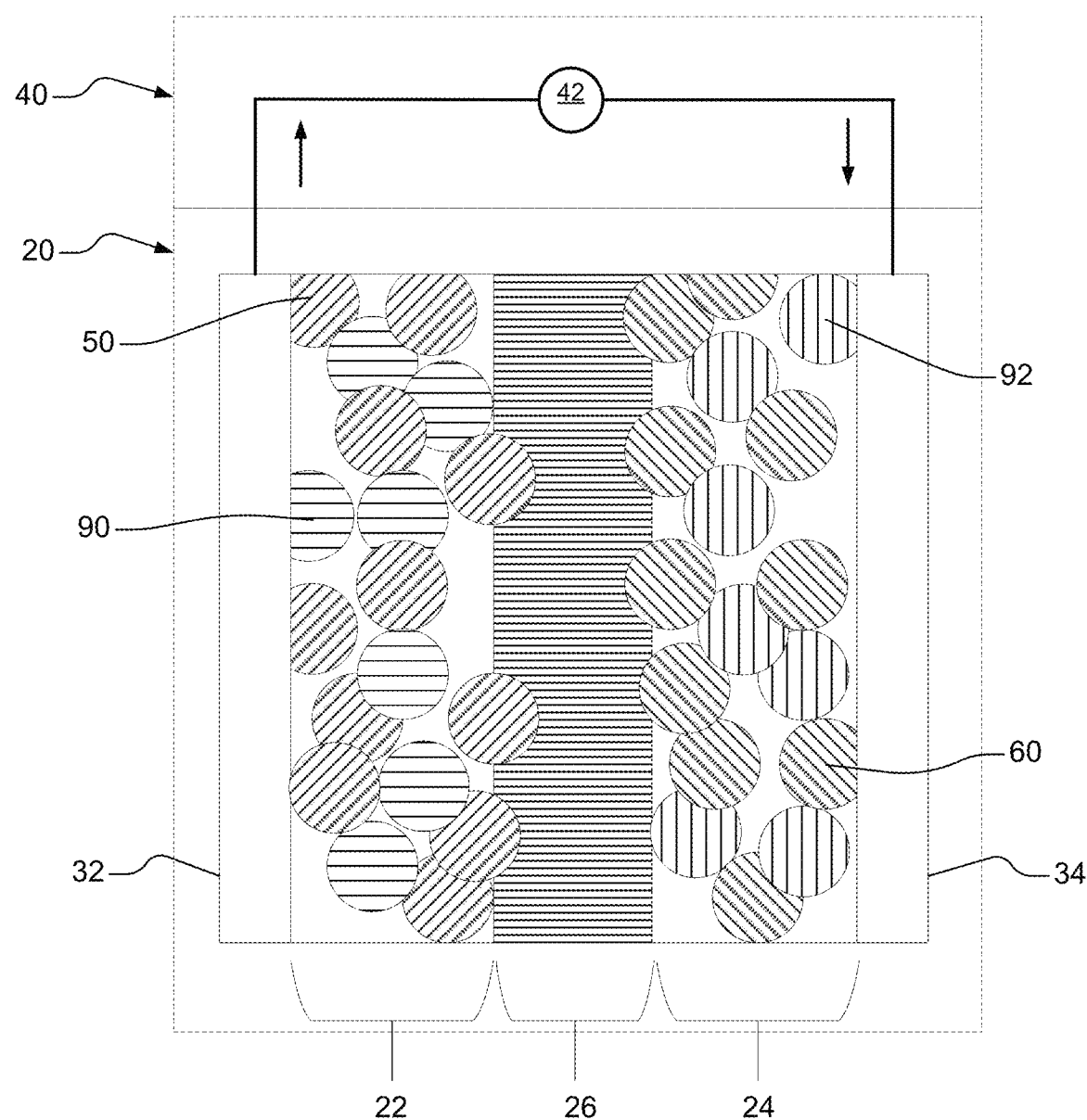
FIG. 1 is an illustration of an example solid-state battery including a solid-state electrolyte layer prepared in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology pertains to solid-state batteries including solid-state electrolytes defined by solid solutions that include lithiated zeolite particles impregnated with lithium-containing materials, and also, to method of forming and using the same. Solid-state batteries may include at least one solid component, for example, at least one solid electrode, but may also include semi-solid or gel, liquid, or gas components in certain variations. Solid-state batteries may have a bipolar stacking design comprising a plurality of bipolar electrodes where a first mixture of solid-state electroactive material particles (and optional solid-state electrolyte particles) is disposed on a first side of a current collector, and a second mixture of solid-state electroactive material particles (and optional solid-state electrolyte particles) is disposed on a second side of a current collector that is parallel with the first side. The first mixture may include, as the solid-state electroactive material particles, cathode material particles. The second mixture may include, as solid-state electroactive material particles, anode material particles. The solid-state electrolyte particles in each instance may be the same or different.

In other variations, the solid-state batteries may have a monopolar stacking design comprising a plurality of monopolar electrodes where a first mixture of solid-state electroactive material particles (and optional solid-state electrolyte particles) is disposed on both a first side and a second side of a first current collector, where the first and second side are substantially parallel, and a second mixture of solid-state electroactive material particles (and optional solid-state electrolyte particles) is disposed on both a first side and a second side of a second current collector. The first mixture may include, as the solid-state electroactive material particles, cathode material particles. The second mixture may include, as solid-state electroactive material particles, anode material particles. The solid-state electrolyte particles in each instance may be the same or different.

In each instance, the solid-state batteries may be incorporated into energy storage devices, like rechargeable lithium-ion batteries, which may be used in automotive transportation applications (e.g., motorcycles, boats, tractors, buses, mobile homes, campers, and tanks). The present technology, however, may also be used in other electrochemical devices, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. In various aspects, the present disclosure provides a rechargeable lithium-ion battery that exhibits high temperature tolerance, as well as improved safety and superior power capability and life performance.

An exemplary and schematic illustration of a solid-state electrochemical cell unit (also referred to as a "solid-state battery" and/or "battery") 20 that cycles lithium ions is shown in FIG. 1. The battery 20 includes a negative electrode (e.g., anode) 22, a positive electrode (e.g., cathode) 24, and an electrolyte layer 26 that occupies a space defined between the two or more electrodes 22, 24. The electrolyte layer 26 is a solid-state or semi-solid state separating layer that physically separates the negative electrode 22 from the positive electrode 24, and may be, as further detailed below, defined by a solid solution that includes lithiated zeolite particles impregnated with lithium-containing materials.

A first or negative electrode current collector 32 may be positioned at or near the negative electrode 22. The first current collector 32 together with the negative electrode 22 may be referred to as a negative electrode assembly. The first current collector 32 may be a metal foil, metal grid or screen, or expanded metal comprising copper or any other appropriate electrically conductive material known to those of skill in the art. A second or positive electrode current collector 34 may be positioned at or near the positive electrode 24. The second current collector 34 with the positive electrode 24 may be referred to as a positive electrode assembly. The second current collector 34 may be a metal foil, metal grid or screen, or expanded metal comprising aluminum or any other appropriate electrically conductive material known to those of skill in the art.

Although not illustrated, the skilled artisan will recognize that in certain variations, the first current collector 32 may be a first bipolar current collector and/or the second current collector 34 may be a second bipolar current collector. For example, the first current collector 32 and/or the second current collector 34 may be cladded foils, for example, where one side (e.g., the first side or the second side) of the current collector 32, 34 includes one metal (e.g., first metal)

and another side (e.g., the other side of the first side or the second side) of the current collector 32 includes another metal (e.g., second metal). The cladded foils may include, for example, aluminum-copper (Al—Cu), nickel-copper (Ni—Cu), stainless steel-copper (SS-Cu), aluminum-nickel (Al—Ni), aluminum-stainless steel (Al-SS), and nickel-stainless steel (Ni-SS). In certain variations, the first current collector 32 and/or second current collectors 34 may be pre-coated, such as graphene or carbon-coated aluminum current collectors.

In each instance, the first current collector 32 and the second current collector 34 respectively collect and move free electrons to and from an external circuit 40. For example, an interruptible external circuit 40 and a load device 42 may connect the negative electrode 22 (through the first current collector 32) and the positive electrode 24 (through the second electrode current collector 34). The battery 20 can generate an electric current (indicated by arrows in FIG. 1) during discharge by way of reversible electrochemical reactions that occur when the external circuit 40 is closed (to connect the negative electrode 22 and the positive electrode 24) and when the negative electrode 22 has a lower potential than the positive electrode 24. The chemical potential difference between the negative electrode 22 and the positive electrode 24 drives electrons produced by a reaction, for example, the oxidation of intercalated lithium, at the negative electrode 22, through the external circuit 40 towards the positive electrode 24. Lithium ions, which are also produced at the negative electrode 22, are concurrently transferred through the electrolyte layer 26 towards the positive electrode 24. The electrons flow through the external circuit 40 and the lithium ions migrate across the electrolyte layer 26 to the positive electrode 24, where they may be plated, reacted, or intercalated. The electric current passing through the external circuit 40 can be harnessed and directed through the load device 42 (in the direction of the arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. The connection of the external power source to the battery 20 promotes a reaction, for example, non-spontaneous oxidation of intercalated lithium, at the positive electrode 24 so that electrons and lithium ions are produced. The electrons, which flow back towards the negative electrode 22 through the external circuit 40, and the lithium ions, which move across the electrolyte layer 26 back towards the negative electrode 22, reunite at the negative electrode 22 and replenish it with lithium for consumption during the next battery discharge cycle. As such, a complete discharging event followed by a complete charging event is considered to be a cycle, where lithium ions are cycled between the positive electrode 24 and the negative electrode 22.

Although the illustrated example includes a single positive electrode 24 and a single negative electrode 22, the skilled artisan will recognize that the current teachings apply to various other configurations, including those having one or more cathodes and one or more anodes, as well as various current collectors and current collector films with electroactive particle layers disposed on or adjacent to or embedded within one or more surfaces thereof. Likewise, it should be recognized that the battery 20 may include a variety of other components that, while not depicted here, are nonetheless known to those of skill in the art. For example, the battery 20 may include a casing, a gasket, terminal caps, and any other conventional components or materials that may be situated within the battery 20, including between or around the negative electrode 22, the positive electrode 24, and/or the electrolyte layer 26.

In many configurations, each of the negative electrode current collector 32, the negative electrode 22, the electrolyte layer 26, the positive electrode 24, and the positive electrode current collector 34 can be prepared as relatively thin layers (for example, from several microns to a millimeter or less in thickness) and assembled in layers connected in series arrangement to provide a suitable electrical energy, battery voltage and power package, for example, to yield a Series-Connected Elementary Cell Core ("SECC"). In various other instances, the battery 20 may further include electrodes 22, 24 connected in parallel to provide suitable electrical energy, battery voltage, and power for example, to yield a Parallel-Connected Elementary Cell Core ("PECC").

The size and shape of the battery 20 may vary depending on the particular applications for which it is designed. Battery-powered vehicles and hand-held consumer electronic devices are two examples where the battery 20 would most likely be designed to different size, capacity, voltage, energy, and power-output specifications. The battery 20 may also be connected in series or parallel with other similar lithium-ion cells or batteries to produce a greater voltage output, energy, and power if it is required by the load device 42. The battery 20 can generate an electric current to the load device 42 that can be operatively connected to the external circuit 40. The load device 42 may be fully or partially powered by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be an electricity-generating apparatus that charges the battery 20 for purposes of storing electrical energy.

With renewed reference to FIG. 1, the electrolyte layer 26 provides electrical separation—preventing physical contact—between the negative electrode 22 and the positive electrode 24. The electrolyte layer 26 may be defined by a plurality of lithium ion-exchange zeolite particles (i.e., lithiated zeolite particles) disposed in one or more layers so as to define the three-dimensional structure of the electrolyte layer 26. The lithiated zeolite particles may include a plurality of lithium-containing materials disposed within pores or cages defined within the individual lithiated zeolite particles. For example, an average porosity for the lithiated zeolite particles may be greater than or equal to about 1 vol. % to less than or equal to about 80 vol. %, and in certain aspects, optionally greater than or equal to about 30 vol. % to less than or equal to about 60 vol. %; and the lithium-containing materials may occupy greater than or equal to about 10% to less than or equal to about 100%, optionally greater than or equal to about 20% to less than or equal to about 80%, optionally greater than or equal to about 30% to less than or equal to about 60%, and in certain aspects, optionally greater than or equal to about 50% to less than or equal to about 80%, of a total porosity of each lithiated zeolite particle. The lithium-containing materials may be uniformly distributed within the network defining each lithiated zeolite particle.

The lithiated zeolite particles may include or consist essentially of particles of one or more natural or synthetic zeolite materials. The term "zeolite" refers to a synthetic or natural crystalline material having a porous framework structure defined tetrahedra atoms (e.g., silicon, aluminum, phosphorus) connected by bridging oxygen atoms. For example, zeolites can include a three-dimensional framework of $AlO_2$ and $SiO_2$ tetrahedral units linked to each other by shared oxygen atoms. The zeolites further include extra-framework cations (e.g., hydrogen, sodium, potassium, calcium, and/or ammonia) that offset the negative charge introduced by each tetrahedral unit. The terms "lithiated zeolite particles" and "lithium ion-exchange zeolite particles" are zeolites that have undergone ion-exchange with lithium ions such that a plurality of lithium ions is present within the zeolite as free ions and/or as the extra-framework ions.

An amount of the extra-framework cations (including the lithium ions) at least partially depends on the silicon to aluminum (Si:Al) ratio of the specific zeolite material and the cation exchange capacity (CEC) of the zeolite material. In certain variations, the zeolite may have an aluminum to silicon ratio greater than or equal to about 0.01 to less than or equal to about 0.5, and in certain aspects, optionally greater than or equal to about 0.2 to less than or equal to about 0.4. In some instances, a zeolite having more silicon (e.g., a silicon to aluminum ratio greater than about 1) may be desirable so as to improve the stability of the zeolite. In other instances, as zeolite having more aluminum (e.g., a silicon to aluminum ratio less than about 5) may be desirable so as to improve hydrofluoric acid (HF) scavenger function. In various aspects, the lithiated zeolite particles may include greater than or equal to about 10 wt. % of the lithium ions and greater than or equal to about 70 wt. % of other extra-framework cations.

In each instance, the lithiated zeolite particles have voids or pores in the form of cages or channels between the tetrahedra, which are defined by rings (by 8-membered, 9-membered, 10-membered, and/or 12-membered rings) of interconnected oxygen (O), silicon (Si), and/or aluminum (Al) atoms. An average particle size for the lithiated zeolite particles may be greater than or equal to about 100 nanometers (nm) to less than or equal to about 5 micrometers or microns (μm), and in certain aspects, optionally greater than or equal to about 500 nanometers (nm) to less than or equal to about 1 μm, while an average pore diameter for the lithiated zeolite particles may be greater than or equal to about 0.1 nm to less than or equal to about 2 nm, and in certain aspects, optionally greater than or equal to about 0.5 nm to less than or equal to about 1 nm.

In certain variations, the lithium-containing materials may be in the form of lithium-containing particles. An average particle size of the lithium-containing particles is less than the average pore diameter for the lithiated zeolite particles. For example, an average particle size of the lithium-containing particles may be greater than or equal to about 0.1 nm to less than or equal to about 5 nm, and in certain aspects, optionally greater than or equal to about 0.5 nm to less than or equal to about 2 nm. In certain variations, the lithium-containing materials may be selected from the group consisting of: lithium phosphate ($Li_3PO_4$), lithium nitrate ($LiNO_3$), lithium fluoride (LiF), lithium oxide ($Li_2O$), lithium peroxide ($Li_2O_2$), lithium lanthanum titanate ($La_{0.5}Li_{0.5}TiO_3$), thio-LISICON ($Li_{3.25}Ge_{0.25}P_{0.75}S_4$), sulfide glass ceramics (like $Li_7P_3S_{11}$ and $Li_2S$—$SiS_2$—$Li_3PO_4$), and combinations thereof.

The incorporation of the lithium-containing material improves the ionic conductivity of the lithiated zeolite particles. For example, in certain variations, the electrolyte layer 26 may have an ionic conductivity greater than or equal to about $1\times10^{-5}$ S·cm$^{-1}$ to less than or equal to about $1\times10^{-1}$ S·cm$^{-1}$, and in certain aspects, optionally greater than or equal to about $1\times10^{-4}$ S·cm$^{-1}$ to less than or equal to about $1\times10^{-2}$ S·cm$^{-1}$. In certain variations, the electrolyte layer 26 may further include a superionic additive incorporated within other pores or cages defined within the individual lithiated zeolite particles to further improve the ionic conductivity of the electrolyte layer 26. For example, the electrolyte layer 26 may include, for example, greater than or equal to about 20 wt. % to less than or equal to about 80 wt. %, and in certain aspects, optionally greater than or equal to about 40 wt. % to less than or equal to about 60 wt. %, of the lithiated zeolite particles; greater than or equal to about 20 wt. % to less than or equal to about 80 wt. %, optionally greater than or equal to about 5 wt. % to less than or equal to about 50 wt. %, and in certain aspects, optionally greater than or equal to about 30 wt. % to less than or equal to about 40 wt. %, of the lithium-containing materials; and greater than or equal to about 20 wt. % to less than or equal to about 80 wt. %, and in certain aspects, optionally greater than or equal to about 40 wt. % to less than or equal to about 60 wt. %, of the superionic additive.

The superionic materials may include, for example, sulfide based solid electrolytes (such as $Li_{10}GeP_2S_{12}$), oxide-based solid electrolytes (such as $Li_7La_3Zr_2O_{12}$ (LLZO)), nitride-based solid electrolytes (such as $Li_3N$), hydride-based solid electrolytes (such as $LiB_{11}H_{14}$, $LiBH_4$, and the like), and/or halide-based solid electrolytes (such as $Li_{2+x}Zr_{1-x}M_xCl_6$ (where M is In, Sc, or a combination thereof and 1 wt. %≤x≤40 wt. %)). The lithium-containing particles and the superionic additive may be uniformly distributed within the network defining each lithiated zeolite particle. The electrolyte layer 26 including the superionic additive may have an ionic conductivity greater than or equal to about $1\times10^{-5}$ S·cm$^{-1}$ to less than or equal to about $1\times10^{-1}$ S·cm$^{-1}$, and in certain aspects, optionally greater than or equal to about $1\times10-4$ S·cm$^{-1}$ to less than or equal to about $1\times10^{-2}$ S·cm$^{-1}$.

With renewed reference to FIG. 1, the negative electrode 22 may be formed from a lithium host material that is capable of functioning as a negative terminal of a lithium-ion battery. In various aspects, as illustrated, the negative electrode 22 may be defined by a plurality of negative electroactive material particles 50. Such negative electroactive material particles 50 may be disposed in one or more layers so as to define the three-dimensional structure of the negative electrode 22. In certain variations, the negative electrode 22 may also include an electrolyte disposed with the negative electroactive material particles 50. The electrolyte may be a liquid electrolyte, a semi-solid or gel electrode, or a solid-state electrolyte. For example, in certain variations, as illustrated, the negative electrode 22 may include a first plurality of solid-state electrolyte particles 90 in combination with the negative electroactive material particles 50. The negative electrode 22 may include greater than or equal to about 30 wt. % to less than or equal to about 98 wt. %, and in certain aspects, optionally greater than or equal to about 50 wt. % to less than or equal to about 95 wt. %, of the negative electroactive material particles 50, and greater than or equal to about 0 wt. % to less than or equal to about 50 wt. %, and in certain aspects, optionally greater than or equal to about 5 wt. % to less than or equal to about 20 wt. %, of the first plurality of solid-state electrolyte particles 90. In each instance, the negative electrode 22 (including the one or more layers) may have an average thickness greater than or equal to about 0 nm to less than or equal to about 500 µm, optionally greater than or equal to about 1 µm to less than or equal to about 500 µm, and in certain aspects, optionally greater than or equal to about 10 µm to less than or equal to about 200 µm.

In certain variations, the first plurality of solid-state electrolyte particles 90 may include lithiated zeolite particles like those defining the electrolyte layer 26 and, additionally or alternatively, sulfide-based particles, oxide-based particles, metal-doped or aliovalent-substituted oxide particles, nitride-based particles, hydride-based particles, halide-based particles, and/or borate-based particles.

The sulfide-based particles may include, for example, a pseudobinary sulfide, a pseudoternary sulfide, and/or a pseudoquaternary sulfide. Example pseudobinary sulfide systems include $Li_2S$—$P_2S_5$ systems (such as, $Li_3PS_4$, $Li_7P_3S_{11}$, and $Li_{9.6}P_3S_{12}$), $Li_2S$—$SnS_2$ systems (such as, $Li_4SnS_4$), $Li_2S$—$SiS_2$ systems, $Li_2S$—$GeS_2$ systems, $Li_2S$—$B_2S_3$ systems, $Li_2S$—$Ga_2S_3$ system, $Li_2S$—$P_2S_3$ systems, and $Li_2S$—$Al_2S_3$ systems. Example pseudoternary sulfide systems include $Li_2O$—$Li_2S$—$P_2S_5$ systems, $Li_2S$—$P_2S_5$—$P_2O_5$ systems, $Li_2S$—$P_2S_5$—$GeS_2$ systems (such as, $Li_{3.25}Ge_{0.25}P_{0.75}S_4$ and $Li_{10}GeP_2S_{12}$), $Li_2S$—$P_2S_5$—LiX systems (where X is one of F, Cl, Br, and I) (such as, $Li_6PS_5Br$, $Li_6PS_5Cl$, $L_7P_2S_8I$, and $Li_4PS_4I$), $Li_2S$—$As_2S_5$—$SnS_2$ systems (such as, $Li_{3.833}Sn_{0.833}As_{0.166}S_4$), $Li_2S$—$P_2S_5$—$Al_2S_3$ systems, $Li_2S$—LiX—$SiS_2$ systems (where X is one of F, Cl, Br, and I), $0.4LiI·0.6Li_4SnS_4$, and $Li_{11}Si_2PS_{12}$. Example pseudoquaternary sulfide systems include $Li_2O$—$Li_2S$—$P_2S_5$—$P_2O_5$ systems, $Li_{9.54}S_{11.74}P_{1.44}S_{11.7}Cl_{0.3}$, $Li_7P_{2.9}Mn_{0.1}S_{10.7}I_{0.3}$, and $Li_{10.35}[Sn_{0.27}Si_{1.08}]P_{1.65}S_{12}$.

The oxide-based particles may include one or more garnet ceramics, LISICON-type oxides, NASICON-type oxides, and Perovskite type ceramics. The garnet ceramics may be selected from the group consisting of: $Li_7La_3Zr_2O_{12}$, $Li_{6.2}Ga_{0.3}La_{2.95}Rb_{0.05}Zr_2O_{12}$, $L_{16.85}La_{2.9}Ca_{0.1}Zr_{1.75}Nb_{0.25}O_{12}$, $L_{16.25}Al_{0.25}La_3Zr_2O_{12}$, $Li_{6.75}La_3Zr_{1.75}Nb_{0.25}O_{12}$, and combinations thereof. The LISICON-type oxides may be selected from the group consisting of: $Li_{2+2x}Zn_{1-x}GeO_4$ (where $0<x<1$), $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), and combinations thereof. The NASICON-type oxides may be defined by $LiMM'(PO_4)_3$, where M and M' are independently selected from Al, Ge, Ti, Sn, Hf, Zr, and La. For example, in certain variations, the NASICON-type oxides may be selected from the group consisting of: $Li_{1+x}Al_xGe_{2-x}(PO_4)_3$ (LAGP) (where $0≤x≤2$), $Li_{1.4}Al_{0.4}Ti_{1.6}(PO_4)_3$, $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), and combinations thereof.

The metal-doped or aliovalent-substituted oxide particles may include, for example, aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where $0<x<2$ and $0<y<3$), and combinations thereof. The nitride-based particles may include, for example, $Li_3N$, $Li_7PN_4$, $LiSi_2N_3$, and combinations thereof. The hydride-based particles may include, for example, $LiBH_4$, $LiBH_4$—LiX (where x=Cl, Br, or I), $LiNH_2$, $Li_2NH$, $LiBH_4$—$LiNH_2$, $Li_3AlH_6$, and combinations thereof. The halide-based particles may include, for example, LiI, $Li_3InCl_6$, $Li_2CdC_{14}$, $Li_2MgCl_4$, $LiCdI_4$, $Li_2ZnI_4$, $Li_3OCl$, $Li_3YCl_6$, $Li_3YBr_6$, and combinations thereof. The borate-based particles may include, for example, $Li_2B_4O_7$, $Li_2O$—$B_2O_3$—$P_2O_5$, and combinations thereof.

In certain variations, the negative electroactive material particles 50 may include a lithium-containing negative electroactive material, such as a lithium alloy. In other variations, the negative electroactive material particles 50 may include, for example only, a carbonaceous negative electroactive material (such as, graphite, hard carbon, soft carbon, and the like) and/or a metallic negative electroactive material (such as tin, aluminum, magnesium, germanium, and alloys thereof, and the like). In further variations, the negative electroactive material particles 50 may include a silicon-based negative electroactive material. In still further variations, although not illustrated, the negative electrode 22 may be a composite electrode including a combination of negative electroactive materials. For example, the negative electrode 22 may include a first plurality of negative electroactive material particles and a second plurality of negative electroactive material particles. In certain variations, a ratio of the first negative electroactive material defining the first plurality of negative electroactive material particles to the second negative electroactive material defining the second plurality of negative electroactive material particles may be greater than or equal to about 5:95 to less than or equal to about 95:5. In certain variations, the first and second negative electroactive materials may be independently selected from the group including, for example, lithium, lithium alloys, carbonaceous negative electroactive materials (such as, graphite, hard carbon, soft carbon, and the like), metallic negative electroactive materials (such as tin, aluminum, magnesium, germanium, and alloys thereof, and the like), and silicon-based negative electroactive material.

Although not illustrated, it should be understood that, in certain variations, the negative electrode 22 may further include an electronically conductive material (i.e. conductive additive) that provides an electron conductive path and/or a polymeric binder material that improves the structural integrity of the negative electrode 22. For example, the negative electrode 22 may include greater than or equal to about 30 wt. % to less than or equal to about 98 wt. %, and in certain aspects, optionally greater than or equal to about 60 wt. % to less than or equal to about 95 wt. %, of the negative electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder.

Example polymeric binders include polyimide, polyamic acid, polyamide, polysulfone, polyvinylidene difluoride (PVdF), polytetrafluoroethylene (PTFE), polyacrylic acid (PAA), blends of polyvinylidene fluoride and polyhexafluoropropene, polychlorotrifluoroethylene, ethylene propylene diene monomer (EPDM) rubber, carboxymethyl cellulose (CMC), nitrile butadiene rubber (NBR), styrene-butadiene rubber (SBR), lithium polyacrylate (LiPAA), sodium polyacrylate (NaPAA), sodium alginate, and/or lithium alginate. Electronically conducting materials may include, for example, carbon-based materials, powdered nickel or other metal particles, or conductive polymers. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SUPER P® (SP)), and the like. Example conductive polymers include polyaniline, polythiophene, polyacetylene, polypyrrole, and the like.

The positive electrode 24 is formed from a lithium-based active material that is capable of undergoing lithium intercalation and deintercalation, alloying and dealloying, or plating and stripping, while functioning as the positive terminal of a lithium-ion battery. In various aspects, as illustrated, the positive electrode 24 may be defined by a plurality of positive electroactive material particles 60. Such positive electroactive material particles 60 may be disposed in one or more layers so as to define the three-dimensional structure of the positive electrode 24. In certain variations, the positive electrode 24 may also include an electrolyte disposed with the positive electroactive material particles 60. The electrolyte may be a liquid electrolyte, a semi-solid or gel electrode, or a solid-state electrolyte. For example, in certain variations, as illustrated, the positive electrode 24 may include a second plurality of solid-state electrolyte particles 92 in combination with the positive electroactive material particles 60. For example, the positive electrode 24 may include greater than or equal to about 30 wt. % to less than or equal to about 98 wt. %, and in certain aspects, optionally greater than or equal to about 50 wt. % to less than or equal to about 95 wt. %, of the positive solid-state electroactive particles 60 and greater than or equal to about 0 wt. % to less than or equal to about 50 wt. %, and in certain aspects, optionally greater than or equal to about 5 wt. % to less than or equal to about 20 wt. %, of the second plurality of solid-state electrolyte particles 92. In each instance, the positive electrode 24 (including the one or more layers) may have an average thickness greater than or equal to about 1 µm to less than or equal to about 500 µm, and in certain aspects, optionally greater than or equal to about 10 µm to less than or equal to about 200 µm.

The second plurality of solid-state electrolyte particles 92 may be the same as or different from the first plurality of solid-state electrolyte particles 90. For example, in certain variations, like the solid-state electrolyte particles 90, the solid-state electrolyte particles 92 may include lithiated zeolite particles like those defining the electrolyte layer 26 and, additionally or alternatively, sulfide-based particles, oxide-based particles, metal-doped or aliovalent-substituted oxide particles, nitride-based particles, hydride-based particles, halide-based particles, and/or borate-based particles.

In various aspects, the positive electroactive material particles 60 may include a layered oxide represented by $LiMeO_2$, where Me is a transition metal, such as cobalt (Co), nickel (Ni), manganese (Mn), iron (Fe), aluminum (Al), vanadium (V), or combinations thereof. In other variations, the positive electroactive material particles 60 include an olivine-type oxide represented by $LiMePO_4$, where Me is a transition metal, such as cobalt (Co), nickel (Ni), manganese (Mn), iron (Fe), aluminum (Al), vanadium (V), or combinations thereof. In still other variations, the positive electroactive material particles 60 include a monoclinic-type oxide represented by $Li_3Me_2(PO_4)_3$, where Me is a transition metal, such as cobalt (Co), nickel (Ni), manganese (Mn), iron (Fe), aluminum (Al), vanadium (V), or combinations thereof. In still other variations, the positive electroactive material particles 60 include a spinel-type oxide represented by $LiMe_2O_4$, where Me is a transition metal, such as cobalt (Co), nickel (Ni), manganese (Mn), iron (Fe), aluminum (Al), vanadium (V), or combinations thereof. In still other variations, the positive electroactive material particles 60 includes a tavorite represented by $LiMeSO_4F$ and/or $LiMePO_4F$, where Me is a transition metal, such as cobalt (Co), nickel (Ni), manganese (Mn), iron (Fe), aluminum (Al), vanadium (V), or combinations thereof.

In still further variations, although not illustrated, the positive electrode 24 may be a composite electrode including a combination of positive electroactive materials. For example, the positive electrode 24 may include a first plurality of positive electroactive material particles and a second plurality of positive electroactive material particles. In certain variations, a ratio of the first positive electroactive material defining the first plurality of positive electroactive material particles to the second positive electroactive material defining the second plurality of positive electroactive material particles may be greater than or equal to about 5:95 to less than or equal to about 95:5. In certain variations, the first and second positive electroactive materials may be independently selected from the group including, for example, layered oxides, olivine-type oxides, monoclinic-type oxides, spinel-type oxide, and/or tavorite.

Although not illustrated, it should be understood that, in certain variations, like the negative electrode 22, the positive electrode 24 may further include an electronically conductive material (i.e. conductive additive) that provides an electron conductive path and/or a polymeric binder material that improves the structural integrity of the positive electrode 24. For example, the positive electrode 24 may include greater than or equal to about 30 wt. % to less than or equal to about 98 wt. %, and in certain aspects, optionally greater than or equal to about 60 wt. % to less than or equal to about 95 wt. %, of the positive electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder. The conductive additive(s) and/or binder material(s) as included in the positive electrode 24 may be the same as or different from the conductive additive(s) and/or binder material(s) as included in the negative electrode 22.

Figure 2:
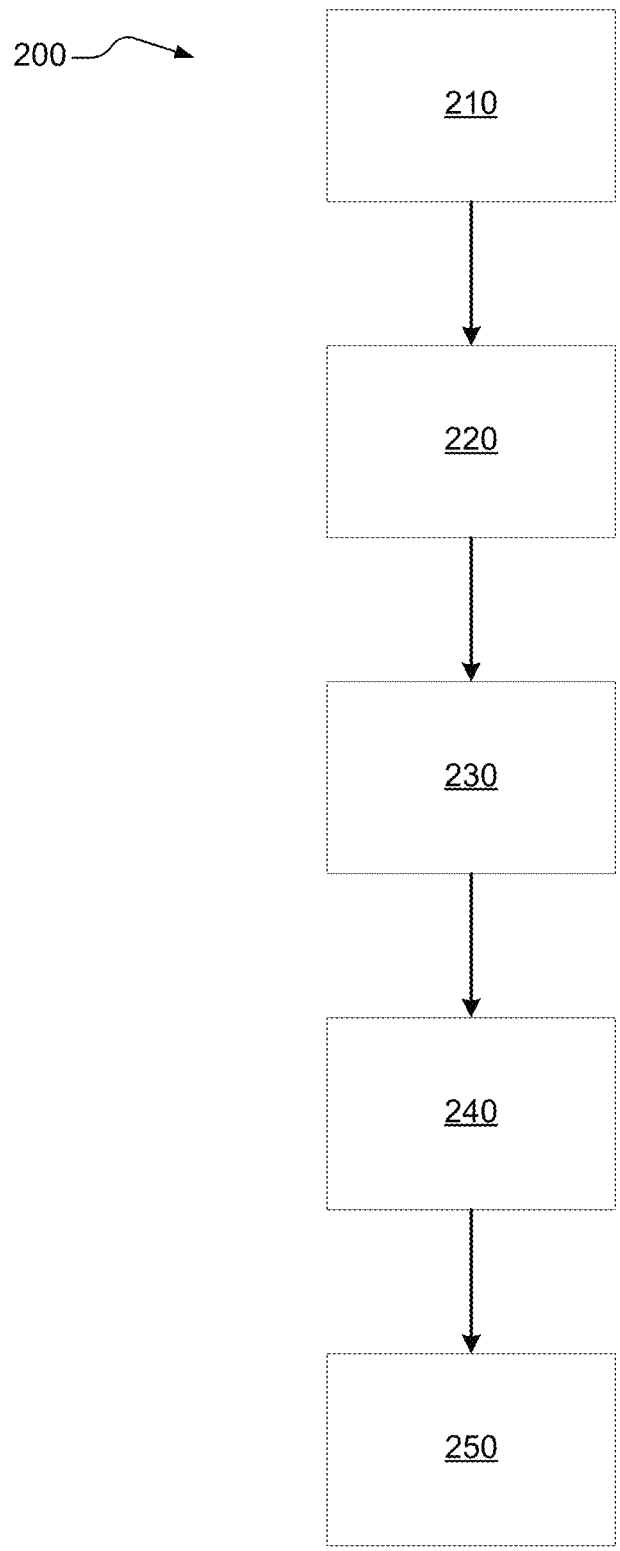
FIG. 2 is a flowchart illustrating an example method for preparing a solid-state electrolyte layer prepared in accordance with various aspects of the present disclosure.

In various aspects, the present disclosure provides methods for forming solid-state electrolytes that are defined by a solid solution that includes lithiated zeolite particles impregnated with lithium-containing materials. For example, as illustrated in FIG. 2, an example method 200 for forming a solid-state electrolyte, like the solid-state electrolyte layer 26 illustrated in FIG. 1, includes impregnating 220 lithiated zeolite particles defining a zeolite powder with a lithium-containing material. In certain variations, the lithium-containing material may be selected from the group consisting of: lithium phosphate ($Li_3PO_4$), lithium nitrate ($LiNO_3$), lithium fluoride (LiF), lithium oxide ($Li_2O$), lithium peroxide ($Li_2O_2$), lithium lanthanum titanate ($La_{0.5}Li_{0.5}TiO_3$), thio-LISICON ($Li_{3.25}Ge_{0.25}P_{0.75}S_4$), sulfide glass ceramics (like $Li_7P_3S_{11}$ and $Li_2S$—$SiS_2$—$Li_3PO_4$), and combinations thereof. In certain variations, for example when the lithium-containing material includes lithium phosphate ($Li_3PO_4$), the impregnating 220 may include contacting (e.g., mixing) lithiated zeolite with a $(NH_4)_3PO_4$ solution such that the $(NH_4)_3PO_4$ solution travels into the pores of the lithiated zeolite and subsequently filtering the mixture to remove excess $(NH_4)_3PO_4$. Once the excess $(NH_4)_3PO_4$ is removed, LiOH may be gradually contacted with (e.g., added to) the mixture such that the lithium reacts with the $(NH_4)_3PO_4$ to form $Li_3PO_4$ within the pores of the lithiated zeolite. In other variations, for example when the lithium-containing material includes lithium nitrate ($LiNO_3$), the impregnating 220 may include dissolving lithium nitrate ($LiNO_3$) in water and subsequently contacting (e.g., mixing) the aqueous solution with the lithiated zeolite and heating the mixture, for example to a temperature about 100° C., such that the lithium nitrate ($LiNO_3$) precipitates within the pores of the lithiated zeolite. In each variation, the method 200 may include preparing 210 the lithiated zeolite particles. The lithiated zeolite particles may be prepared, for example, using methods like those detailed in U.S. Pat. No. 10,615,461, titled "Lithium Ion Battery Including Lithium Ion-Exchange Zeolite Particles", issued Apr. 4, 2020 to Xingcheng Xiao, Sherman H. Zeng, Mei Cai, and Mark W. Verbrugge, the entire disclosure of which is hereby incorporated by reference.

The method 200 further includes pre-sintering 230 the impregnated lithiated zeolite particles to remove gaseous byproducts like water vapor adsorbed in lithiated zeolite, ammonia gas from the ammonia in the cation position and small cage in the zeolite, and/or carbon dioxide resulting from the decomposition of lithium carbonate. Removal of the gaseous byproducts may help to improve the bulk density during subsequent sintering processes, like sintering 250 discussed below. In certain variations, the pre-sintering 230 may include heating the impregnated lithiated zeolite particles to a temperature greater than or equal to about 200° C. to less than or equal to about 600° C., optionally greater than or equal to about 300° C. to less than or equal to about 500° C., an in certain aspects, optionally about 500° C., for a period greater than or equal to about 1 minute to less than or equal to about 760 minutes, and in certain aspects, optionally greater than or equal to about 30 minutes to less than or equal to about 120 minutes.

The method 200 further include applying 240 a pressure to the pre-sintered impregnated lithiated zeolite particles to form a pellet having a selected and controlled porosity. The pressure may be greater than or equal to about 5 MPa to less than or equal to about 250 MPa, and in certain aspects, optionally greater than or equal to about 10 MPa to less than or equal to about 100 MPa, and may be applied for a period greater than or equal to about 0.1 second to less than or equal to about 600 seconds, and in certain aspects, optionally greater than or equal to about 1 second to less than or equal to about 10 seconds. The targeted porosity for the pellet may be greater than or equal to about 30 vol. % to less than or equal to about 70 vol. %, and in certain aspects, optionally greater than or equal to about 40 vol. % to less than or equal to about 60 vol. %.

The method 200 further includes sintering 250 the amorphous pellet to form a solid solution that defines the solid-state electrolyte. In certain variations, the sintering 250 may include heating the amorphous pellet to a temperature greater than or equal to about 800° C. to less than or equal to about 1,200° C., optionally greater than or equal to about 800° C. to less than or equal to about 1,000° C., and in certain aspects, optionally about 900° C., while a pressure greater than or equal to about 0 MPa to less than or equal to about 50 MPa is applied. Notably, in the current instance, the sintering 250 can occur at lower temperatures as compared with other oxide based solid-state electrolytes at least in part because of the high surfaces area of the lithiated zeolite particles. For example, the high surface area requires more surface diffusion and less bulk diffusion. In certain variations, the impregnated lithiated zeolite particles may have a specific surfaces area greater than or equal to about 10 $m^2/g$ to less than or equal to about 500 $m^2/g$, and sintering temperatures for the other oxide base solid-state electrolytes are often greater than or equal to about 1,000° C. to less than or equal to about 1,450° C.

Figure 3:
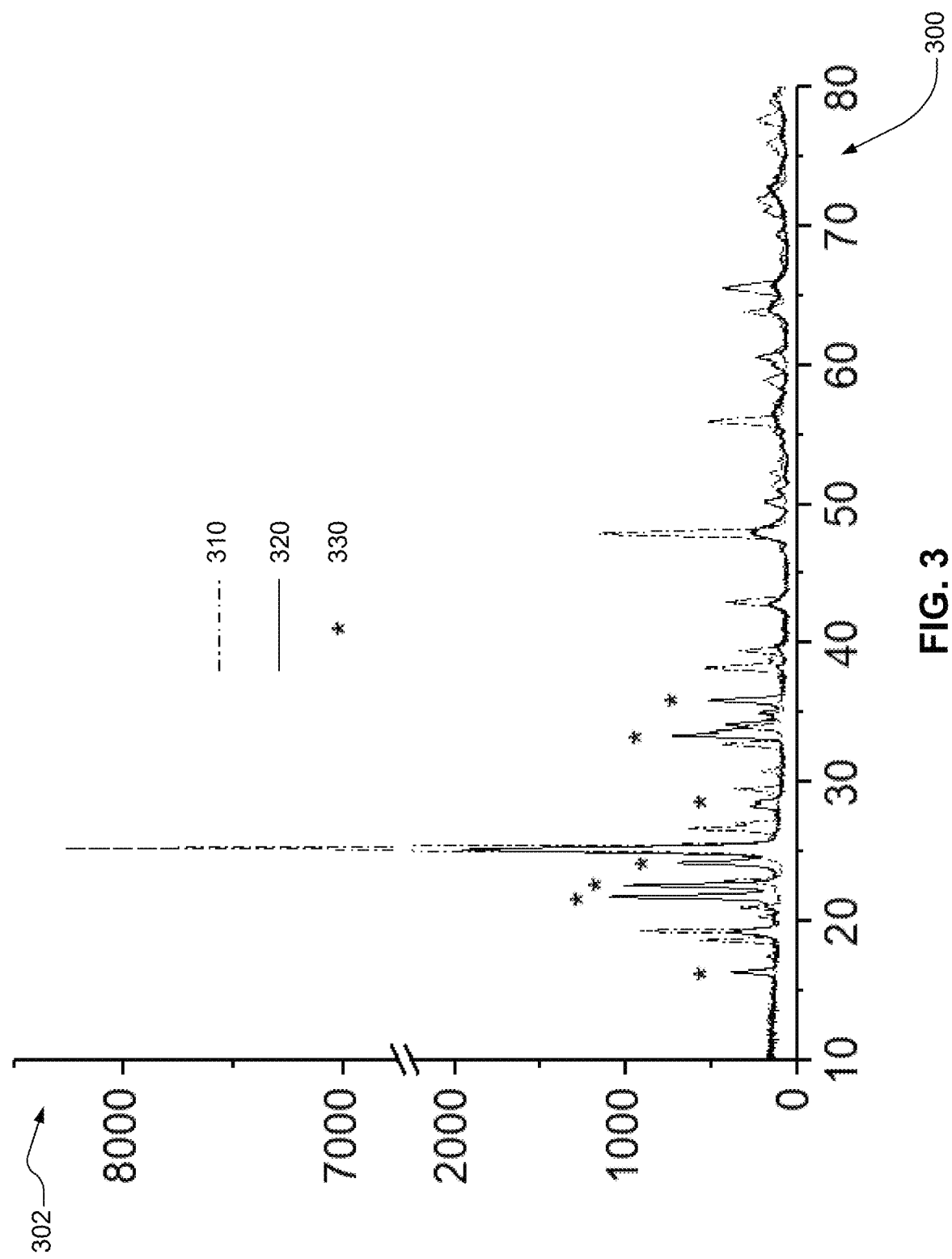
FIG. 3 is a graphical illustration demonstrating the diffraction pattern of an example solid-state electrolyte layer prepared in accordance with various aspects of the present disclosure.

FIG. 3 is a graphical illustration comparing the diffraction pattern of the amorphous pellet 310 as compared to the as-formed solid-state electrolyte 320, where the x-axis 300 represents 2 theta, and the y-axis 302 represents intensity (a.u.). The lithiated zeolite retains its structure following sintering. However, as illustrated by the peak shift and broadening, a solid solution has formed with more crystalline $Li_3PO_4$, represented by 330.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solid-state electrolyte for an electrochemical cell that cycles lithium ions, the solid-state electrolyte being a sintered layer and comprising:
    a plurality of lithiated zeolite particles defining a plurality of pores, each lithiated zeolite particle of the plurality of lithiated zeolite particles having a porosity greater than or equal to about 20 vol. % to less than or equal to about 80 vol. %; and
    a lithium-containing material being disposed in at least a portion of the plurality of pores of the lithiated zeolite particles, the lithium-containing material occupying greater than or equal to about 20% to less than or equal to about 80% of a total porosity of each lithiated zeolite particle.

2. The solid-state electrolyte of claim 1, wherein the lithiated zeolite particles defining the plurality of lithiated zeolite particles have an average particle size greater than or equal to about 100 nanometers to less than or equal to about 5 micrometers, and an average pore diameter for each lithiated zeolite particle is greater than or equal to about 0.1 nanometer to less than or equal to about 2 nanometers.

3. The solid-state electrolyte of claim 1, wherein the lithiated zeolite particles are defined by linked $AlO_2$ and $SiO_2$ tetrahedral units and extra-framework cations dispersed among the tetrahedral units, the extra-framework cations comprising greater than or equal to about 10 wt. % of lithium ions, and the linked $AlO_2$ and $SiO_2$ tetrahedral units having an aluminum to silicon ratio greater than or equal to about 0.2.

4. The solid-state electrolyte of claim 1, wherein an average particle size of the lithium-containing material is greater than or equal to about 0.1 nanometer to less than or equal to about 2 nanometers.

5. The solid-state electrolyte of claim 1, wherein the lithium-containing material is selected from the group consisting of: lithium phosphate, lithium nitrate, lithium fluoride, lithium oxide, lithium peroxide, lithium lanthanum titanate, thio-LISICON, sulfide glass ceramics and combinations thereof.

6. The solid-state electrolyte of claim 1, wherein the sintered layer comprises:
   greater than or equal to about 20 wt. % to less than or equal to about 80 wt. % of the lithiated zeolite particles; and
   greater than or equal to about 20 wt. % to less than or equal to about 80 wt. % of the lithium-containing material.

7. The solid-state electrolyte of claim 1, wherein
   the portion of the pores of the lithiated zeolite particles is a first portion of the pores of the lithiated zeolite particles, and
   the sintered layer further comprises:
      a superionic additive also disposed in a second portion of the pores of the lithiated zeolite particles.

8. The solid-state electrolyte of claim 7, wherein the sintered layer has an ionic conductivity greater than or equal to about $1\times10^{-5}$ S·cm$^{-1}$ to less than or equal to about $1\times10^{-1}$ S·cm$^{-1}$.

9. The solid-state electrolyte of claim 7, wherein the sintered layer comprises greater than or equal to about 20 wt. % to less than or equal to about 80 wt. % of the superionic additive.

10. The solid-state electrolyte of claim 7, wherein the superionic additive is selected from the group consisting of: $Li_{10}GeP_2S_{12}$, $Li_7La_3Zr_2O_{12}$, $Li_3N$, $LiB_{11}H_{14}$, $LiBH_4$, $Li_{2+x}Zr_{1-x}M_xCl_6$ where M is In, Sc, or a combination thereof and 1 wt. %≤x≤40 wt. %, and combinations thereof.

11. An electrochemical cell that cycles lithium ions, the electrochemical cell comprising:
   a first electrode comprising a positive electroactive material;
   a second electrode comprising a negative electroactive material; and
   a solid-state electrolyte physically separating the first and second electrodes, the solid-state electrolyte being a sintered layer and comprising:
      a plurality of lithiated zeolite particles defining a plurality of pores, each lithiated zeolite particle of the plurality of lithiated zeolite particles having a porosity greater than or equal to about 20 vol. % to less than or equal to about 80 vol. %; and
      a lithium-containing material being disposed in at least a portion of the plurality of pores of the lithiated zeolite particle, the lithium-containing material occupying greater than or equal to about 20% to less than or equal to about 80% of a total porosity of each lithiated zeolite particle.

12. The electrochemical cell of claim 11, wherein the lithium-containing material is selected from the group consisting of: lithium phosphate, lithium nitrate, lithium fluoride, lithium oxide, lithium peroxide, lithium lanthanum titanate, thio-LISICON, sulfide glass ceramics and combinations thereof.

13. The electrochemical cell of claim 11, wherein the lithiated zeolite particles are defined by linked $AlO_2$ and $SiO_2$ tetrahedral units and extra-framework cations dispersed among the tetrahedral units, the extra-framework cations comprising greater than or equal to about 10 wt. % of the lithium ions, and the linked $AlO_2$ and $SiO_2$ tetrahedral units having an aluminum to silicon ratio greater than or equal to about 0.2.

14. The electrochemical cell of claim 11,
   wherein the solid-state electrolyte further comprises greater than or equal to about 20 wt. % to less than or equal to about 60 wt. % of a superionic additive also disposed in the pores of the lithiated zeolite particles.

15. The electrochemical cell of claim 14, wherein the superionic additive is selected from the group consisting of: $Li_{10}GeP_2S_{12}$, $Li_7La_3Zr_2O_{12}$, $Li_3N$, $LiB_{11}H_{14}$, $LiBH_4$, $Li_{2+x}Zr_{1-x}M_xCl_6$, where M is In, Sc, or a combination thereof and 1 wt. %≤x≤40 wt. %, and combinations thereof.

16. A method for forming a solid-state electrolyte layer for use in an electrochemical cell that cycles lithium ions, the method comprising:
   obtaining a plurality of lithiated zeolite particles having pores, each lithiated zeolite particle of the plurality of lithiated zeolite particles having a porosity greater than or equal to about 20 vol. % to less than or equal to about 80 vol. %, the lithiated zeolite particles defining a zeolite powder;
   impregnating at least a portion of the pores with a lithium-containing material to form impregnated lithium zeolite particles, the lithium-containing material occupying greater than or equal to about 20% to less than or equal to about 80% of a total porosity of each lithiated zeolite particle;
   heating the impregnated lithium zeolite particles to a first temperature greater than or equal to about 200° C. to less than or equal to about 600° C. to remove any gaseous byproducts and to form a pre-sintered zeolite powder;
   applying a first pressure to the pre-sintered zeolite powder to form a pellet; and
   heating the pellet to a second temperature greater than or equal to about 800° C. to less than or equal to about 1,200° C. while applying a second pressure greater than 0 MPa to less than or equal to about 50 MPa to form a sintered body that defines the solid-state electrolyte layer.

17. The method of claim 16, wherein the lithium-containing material comprises lithium nitrate and the impregnating comprises:
   contacting lithium nitrate to water to form an aqueous solution;
   contacting the aqueous solution to the lithiated zeolite particles to form an admixture; and
   heating the admixture to precipitate the lithium nitrate within the portion of the pores of the lithiated zeolite particles forming the impregnated lithium zeolite particles.

18. The method of claim 16, wherein the lithium-containing material comprises lithium phosphate and the impregnating comprises:
   contacting the lithiated zeolite particles with a $(NH_4)_3PO_4$ solution such that the $(NH_4)_3PO_4$ solution enters into the portion of the pores of the lithiated zeolite particles; and
   contacting LiOH to the lithiated zeolite particles including the $(NH_4)_3PO_4$ solution such that $Li_3PO_4$ forms within the portion of the pores thereby forming the impregnated lithium zeolite particles.

* * * * *